(12) United States Patent
Uribe et al.

(10) Patent No.: US 6,635,369 B2
(45) Date of Patent: Oct. 21, 2003

(54) METHOD FOR IMPROVING FUEL CELL PERFORMANCE

(75) Inventors: Francisco A. Uribe, Los Alamos, NM (US); Thomas Zawodzinski, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 361 days.

(21) Appl. No.: 09/862,933

(22) Filed: May 22, 2001

(65) Prior Publication Data

US 2001/0044040 A1 Nov. 22, 2001

Related U.S. Application Data

(60) Provisional application No. 60/206,474, filed on May 22, 2000.

(51) Int. Cl.[7] ................................................. H01M 8/00
(52) U.S. Cl. ............................................ 429/13; 429/17
(58) Field of Search ...................................... 429/13, 17

(56) References Cited

U.S. PATENT DOCUMENTS

| 4,555,452 | A  | * | 11/1985 | Kahara et al. ................. 429/13 |
| 6,399,231 | B1 |   | 6/2002  | Donahue et al. ............... 429/13 |
| 6,406,806 | B1 | * | 6/2002  | Keskula et al. ................ 429/13 |
| 6,589,686 | B2 | * | 7/2003  | Ovshinsky et al. ........... 429/52 |

* cited by examiner

*Primary Examiner*—Bruce F. Bell
(74) *Attorney, Agent, or Firm*—Ray G. Wilson

(57) ABSTRACT

A method is provided for operating a fuel cell at high voltage for sustained periods of time. The cathode is switched to an output load effective to reduce the cell voltage at a pulse width effective to reverse performance degradation from OH adsorption onto cathode catalyst surfaces. The voltage is stepped to a value of less than about 0.6 V to obtain the improved and sustained performance.

4 Claims, 4 Drawing Sheets

METHOD FOR IMPROVING FUEL CELL PERFORMANCE

RELATED APPLICATIONS

This applications claims the benefit of U.S. Provisional Application Ser. No. 60/206,474, filed May 22, 2000.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to the operation of polymer electrolyte fuel cells, and, more particularly, to the operation of polymer electrolyte fuel cells at high voltages.

BACKGROUND OF THE INVENTION

One of the challenges for polymer electrolyte fuel cells (PEFCs) is to maintain high energy conversion efficiency, particularly for transportation applications. Transportation applications may require a cell to operate under "cruising" conditions at high voltages, e.g., in the range of 0.75 to 0.85 V. At these voltages, the burden of performance is primarily on the cathode because the oxygen reduction reaction (ORR) at the cathode is kinetically sluggish. In comparison, the fuel reaction, i.e., the oxidation of $H_2$ at the anode, introduces negligible performance losses in this voltage range.

Various strategies have been proposed to improve cathode performance. These strategies include catalyst layer composition and catalyst layer structures. Increasing the Pt-catalyst loading at the cathode will increase performance at any voltage; but this "brute force" approach is only partially effective. Our laboratory studies have found that, even at operational fuel cell voltages as high as 0.9 V, PEFC cathodes show mass transport limitations where the cell currents reach plateaus with increasing Pt loading and the value of the limiting currents depends on catalyst composition. For example, for cathodes containing 20% Pt/C, the plateau appears at a loading of about 0.4 mg Pt/$cm^2$ at 0.9 V.

Another approach is to use Pt-alloys rather than pure Pt as the cathode catalyst. Indeed, alloys containing nominal compositions of $Pt_3Cr$ have been used for many years in phosphoric acid fuel cell cathodes. Other Pt-alloys comprising metals such as Mn, Fe, Co, and Ni also enhance the oxygen reduction reaction so that overall PEFC performance is improved.

In all cases, however, Pt-based cathode catalysts appear to have a fundamental limitation when PEFCs are operate at high voltages. Experiments strongly suggest that, at these voltages, there is an inherent Pt activity loss for the ORR due to adsorption onto Pt surfaces of oxygenated species from water. FIG. 1 shows a cyclic voltammogram of a fuel cell cathode containing 0.2 mg Pt/$cm^2$ in a carbon supported catalyst. The anodic currents starting at 0.75 V correspond to the reaction: $Pt+H_2O \rightarrow Pt+OH+H^++e^-$. When the fuel cell is forced to operate at voltages of about 0.75 V and higher, a partial Pt—OH coverage is induced on the catalyst and the number of Pt active sites decreases.

Over time, the active Pt surface area on the cathode becomes insufficient to sustain the ORR at the initial rate. As a consequence, the initial current drops while the cell voltage is maintained at the high level. Within the first 60 minutes at 0.8 V, a cell may drop its current as much as 50% of the original output, as shown by the lower curve of FIG. 2. Polarization curves, widely used as diagnostic tools to evaluate fuel cell performance, do not predict this operational shortcoming. Performance losses in the same time range are not observed when the cell is operated at constant voltages lower than 0.6 V. In this case, a steady state condition is reached within one or two minutes.

PCT Application WO 98/42038, "Fuel Cell with Pulsed Anode Potential," published Sep. 24, 1998, teaches that fuel cell power losses arising from CO poisoning of Pt anode catalyst can be reduced by periodically increasing the anode potential by shorting the anode or by connecting the anode to a positive external voltage. The cathode is shown connected to ground and does not appear to experience any potential change. The anode voltage pulse parameters proposed to overcome CO poisoning of the anode catalyst (pulse width of 10 to 200 ms, pulse amplitude of 700 mV, pulse frequency of 0.01 to 0.5 Hz) do not change the polarization potential of the cathode and are not sufficiently long to remove OH from the Pt active surfaces.

In accordance with the present invention, an operating strategy has been developed to overcome this performance degradation arising from Pt—OH coverage of active Pt sites and maintain an average current close to the initial value even when the fuel cell is operated for long times at high voltages.

Various advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is directed to a method for operating a fuel cell at high voltage for sustained periods of time. The cathode is switched to an output load effective to reduce the cell voltage at a pulse width effective to reverse performance degradation from OH adsorption onto cathode catalyst surfaces. The voltage is stepped to a value of less than about 0.6 V to obtain the improved and sustained performance.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION

In accordance with the present invention, a PEFC is enabled to sustain an average cell current close to an initial value with the PEFC is operated at a high voltage for a sustained period. This sustained high performance is obtained by periodically pulsing the PEFC voltage to a relatively low voltage. The cell voltage is reduced by periodically increasing the current from the cathode. The increased current reduces the potential at the cathode whereby OH is stripped from the Pt catalyst at the cathode.

A voltage pulsing for cathode reactivation in cells operating at a high voltage may be implemented in a computer controlled switching process. In a controlled voltage mode, the computer switches between two chosen voltage levels for selected times, with concomitant current outputs. The output current is variable and depends on the switching program and cell characteristics. No external power supply is needed to produce a reducing voltage at the cathode. The operational cell voltage is set at a level that will reactivate the cathode activity. The potential at the anode does not change appreciably since the fast hydrogen oxidation at the anode occurs at a low polarization. Most of the polarization change (cell voltage change) occurs at the cathode where the OH stripping occurs.

A controlled current mode may also be used. In this case, two current values, with corresponding duration, are switched by the computer. The cell operates at those two current levels during the programmed times. The output cell voltage is variable and will depend on the switching program and cell characteristics. However, it is characteristic of all fuel cells that the output voltage decreases with increasing output current. Thus, the current level for a short duration pulse must be large enough to bring the cathode potential to a sufficiently low value for reducing Pt—OH species and reactivating the cathode catalyst surface.

Figure 2:
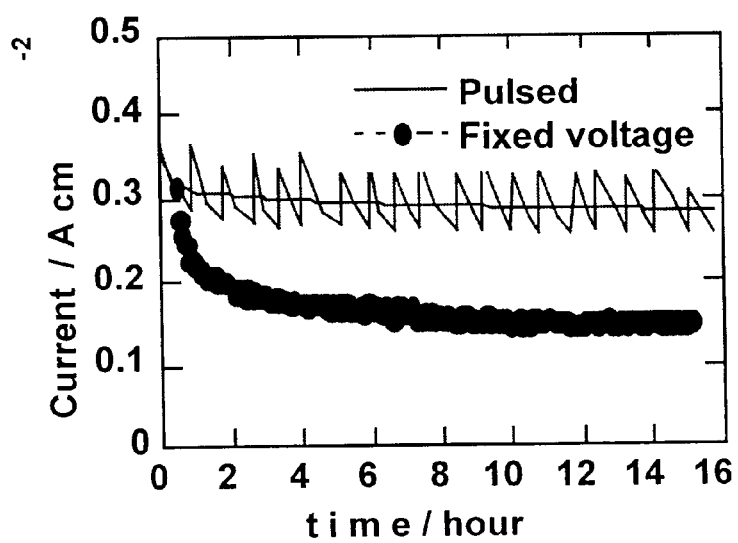
FIG. 2 graphically depicts comparative PEFC performance for operation at a fixed cathode voltage of 0.8 V and for operation with a periodically stepped fuel cell voltage (6 seconds pulse to 0.2 V cell voltage every 600 seconds).

An exemplary operating protocol is shown in FIG. 2, where the lower curve illustrates cell performance at 0.8 V without voltage excursions. The upper curve illustrates the sustained performance available when the cell voltage is pulsed downward to 0.2 V every 600 s for a period of 6 s (a 1% duty cycle). This short voltage pulse was enough to maintain an average current of 300 mA $cm^{-2}$, about 1.5 times the current at a fixed voltage of 0.8 V. The brief voltage excursion of 0.2 V yields current densities as high as 1.4 $Acm^{-2}$ by, apparently, providing the catalyst layer with suitable conditions that favor the ORR at the cathode.

Figure 3:
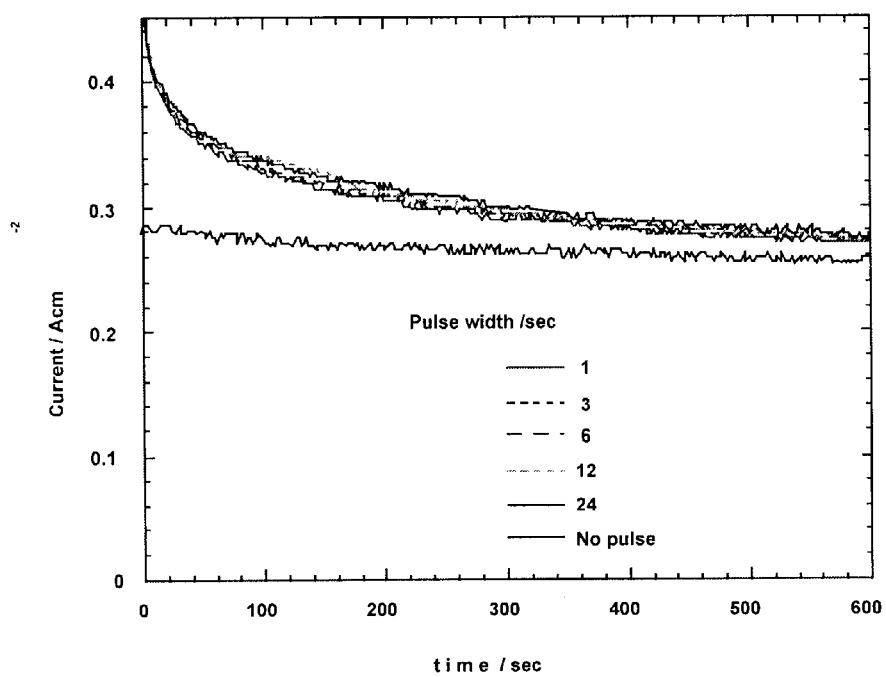
FIG. 3 graphically depicts the effect of pulse width (time) on PEFC performance at 0.8 V with pulse width times ranging from 1 s to 24 s with a step decreasing cell voltage from 0.8 V to 0.2 V.

The effects of pulse width (time) and pulse amplitude (volts) on cell performance at 0.8 V have been explored. FIG. 3 shows the effect of pulse width on cell current. For this experiment, the cell voltage was kept at 0.8 V for at least 10 minutes, stepped from 0.8 V to 0.2 V for times ranging from 1 to 24 s, and then returned to 0.8 V for 600 s. Cell current was recorded for each stepping time. In every case, pulsing brought a beneficial effect. All of the curves fall within a narrow band, indicating that a pulse width greater than 1 s has little effect on cell performance improvement.

Experimental results also show that a pulse width as low as 0.4 s provides the same beneficial effect as longer pulse widths. Pulse widths less than 0.4 s may not be sufficient to provide these benefits.

Figure 4:
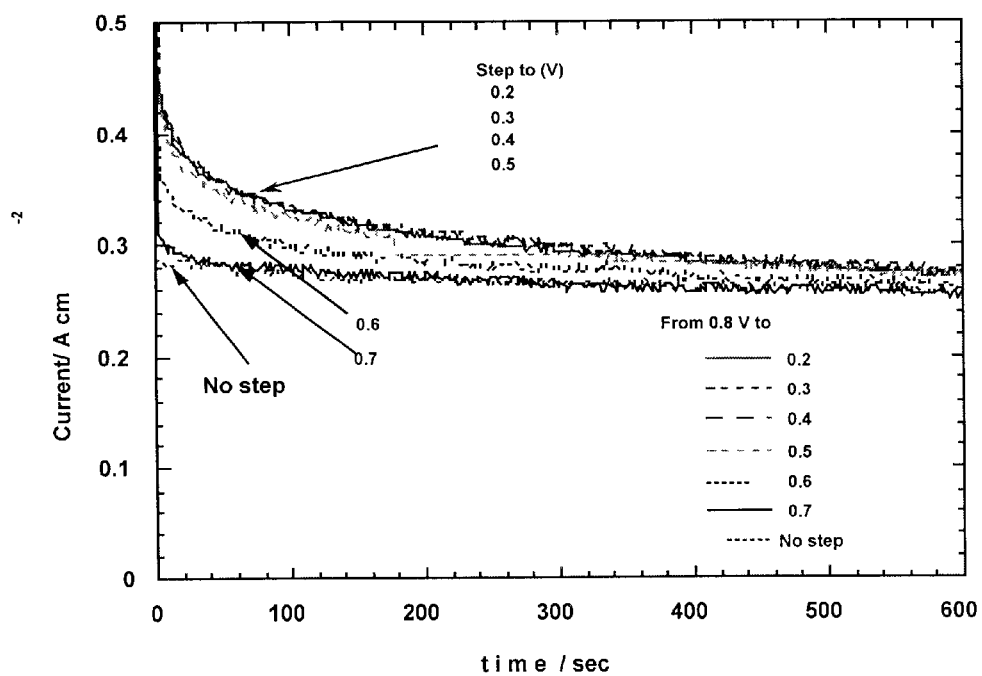
FIG. 4 graphically depicts the effect of amount (volts) of the step decrease on PEFC performance, where the pulse width was 6 s every 600 s.

FIG. 4 shows the effect of various voltage pulse amplitude decreases on continuous output cell current. The cell voltage was stepped from 0.8 V to a lower value for 6 s and then the voltage was brought back to 0.8 V for 600 s. Prior to stepping, the cell was run at 0.8 V for at least 10 minutes. The results clearly show that performance improvement depends on pulse amplitude. Step amplitudes down to 0.5 V or lower produce almost the same result, with a definite performance improvement. Stepping down to 0.6 V shows a small enhancement, while a pulse to 0.7 V shows practically no improvement in performance over the steady state operation.

Figure 1:
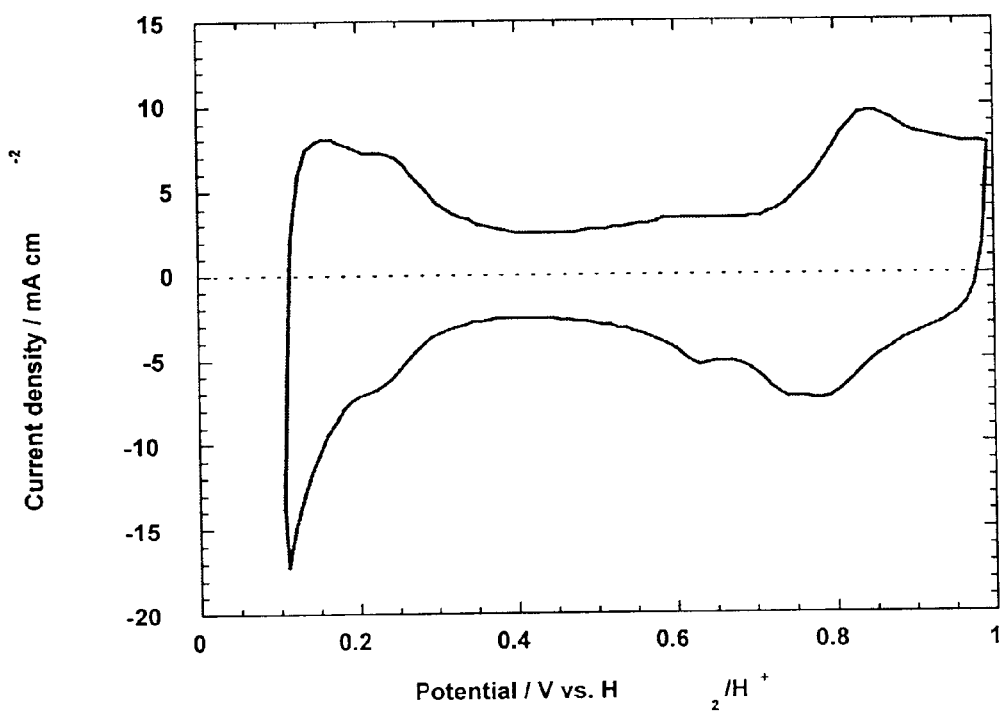
FIG. 1 is a CV diagram of a PEFC cathode at 80° C., with a cathode catalyst loading of 0.2 mg Pt $cm^{-2}$.
Figure 5:
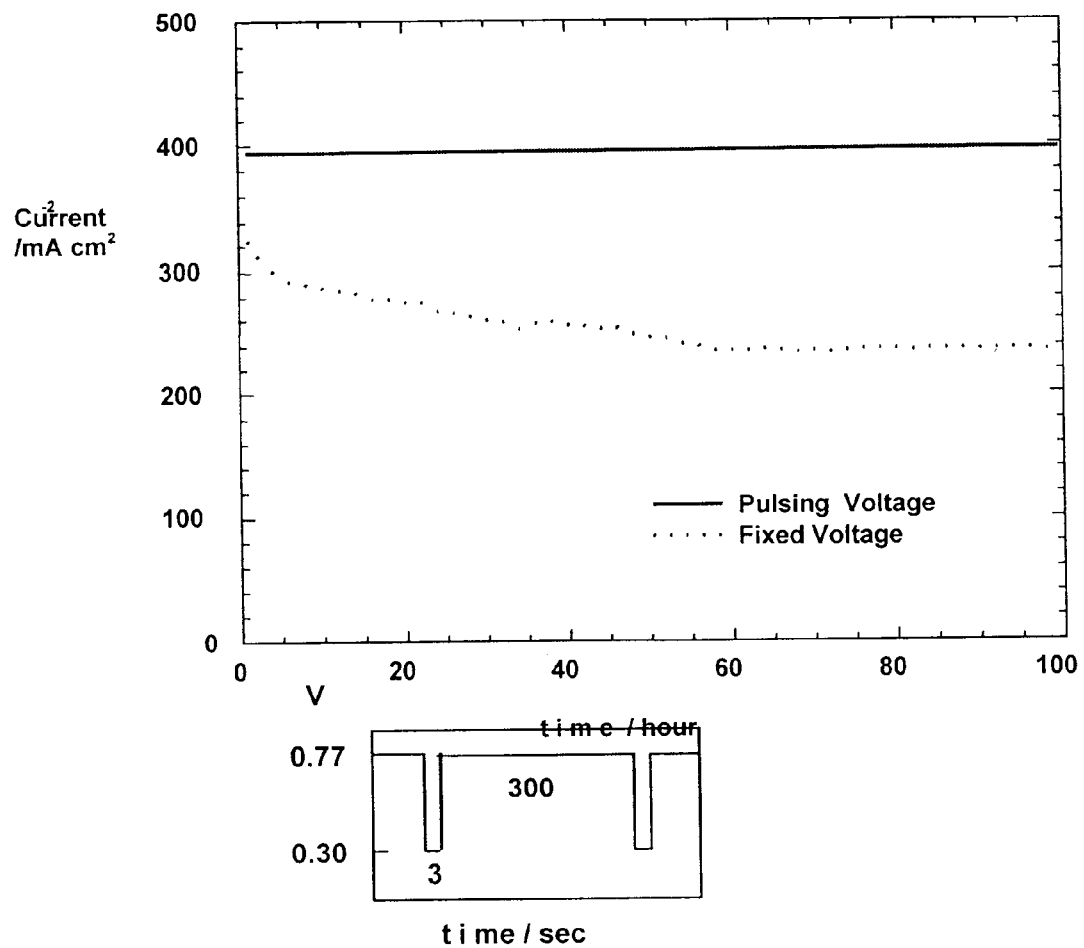
FIG. 5 graphically compares the continuous fuel cell performance at high voltage (0.77 V) with and without pulsing.

An inspection of FIG. 1 provides an explanation for these results. In the potential domain 0.5 to 1.0 V, the anodic currents correspond to Pt—OH formation and cathode currents correspond to $OH^-$ stripping. While the cell is running at, e.g., 0.8 V, Pt—OH forms at the catalyst surface, with a resulting decrease in cathode activity for the ORR. The curves also show that at 0.5 V or lower potentials the Pt surface has been stripped of $OH^-$. Therefore, if, during cell operation, the voltage is stepped down to 0.5 V or lower, it will reactivate the catalyst surface generating OH-free Pt sites. Pulses down to 0.6 V or higher potentials do not have enough reducing power for achieving a complete $OH^-$ desorption from the Pt surface, and the cell shows only a minor, or no, performance improvement upon voltage pulsing, Using the technique of the present invention, high average current densities in fuel cells operating at high voltages have been sustained for long periods of time. In FIG. 5, the upper and lower curves illustrate the results of a fuel cell operating with and without voltage pulsing, respectively, for 100 hours. The fuel cell catalyst loadings were 0.2 mg Pt $cm^{-2}$ (54% Pt—Ru/C) at the anode and 0.4 mg $cm^{-2}$ (20% Pt—Cr 3:1) at the cathode. The cell was operated at 0.77 V for 300 s and pulsed to 0.3 V for 3 s during each cycle (1% duty cycle).

The beneficial effects of a pulsed operation are evident from FIG. 5. The fuel cell that was operated at a fixed voltage generated a mean power of 193 $mW/cm^2$; the fuel cell that was operated under pulsed conditions produced a mean power of 303 $mW/cm^2$. This represents a performance increase of about 57%.

Figure 6:
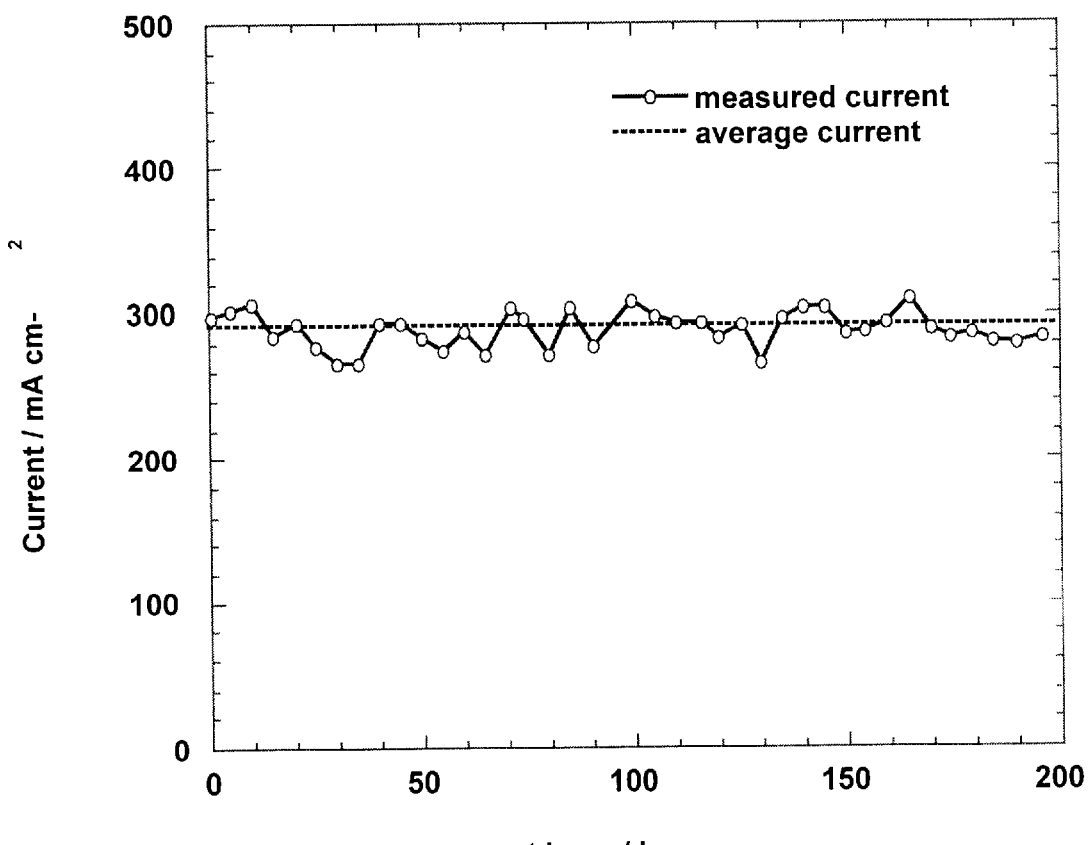
FIG. 6 graphically depicts high voltage PEFC performance using a simulated reformed fuel (35% $H_2$, 35% $N_2$, 25% $CO_2$, 100 ppm CO and 2% air bleed) when operated at 0.77 V and pulsed to 0.4 V cell voltage for 0.4 s at 40 s intervals.

PEFC performance using pulses as short as 0.4 s has been tested. FIG. 6 depicts high voltage performance using a simulated reformed fuel, and operating in a pulsing mode. The cell voltage was kept at 0.77 V for 40 s and periodically pulsed down to 0.40 V for 0.4 s (1% duty cycle). Again, continuous operation at this high voltage without pulsing results in a substantial decay in performance.

This method is useful for any fuel cell in which the cathode operates at half cell voltages exceeding 0.6 V, including hydrogen/air PEFCs and direct methanol fuel cells, using any Pt-based cathode catalyst.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for operating a fuel cell at high voltage for sustained periods including the step of switching the cathode to an output load effective to reduce the cell voltage at a pulse width effective to reverse performance degradation from OH adsorption on cathode catalyst surfaces.

2. The method according to claim 1, where the cell voltage is reduced to a voltage less than 0.6 V.

3. The method according to claim 1, where the cell voltage is reduced to a voltage less than or equal to about 0.5 V.

4. The method according to claim 1, where the cell voltage is reduced over a pulse width equal to or greater than about 0.4 s.

* * * * *